US012525385B2

(12) United States Patent
Takayama

(10) Patent No.: US 12,525,385 B2
(45) Date of Patent: Jan. 13, 2026

(54) COIL COMPONENT

(71) Applicant: Murata Manufacturing Co., Ltd., Kyoto-fu (JP)

(72) Inventor: Kota Takayama, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 795 days.

(21) Appl. No.: 17/854,148

(22) Filed: Jun. 30, 2022

(65) Prior Publication Data

US 2023/0014685 A1 Jan. 19, 2023

(30) Foreign Application Priority Data

Jul. 13, 2021 (JP) ................................ 2021-115779

(51) Int. Cl.
*H01F 27/26* (2006.01)
*H01F 17/04* (2006.01)

(52) U.S. Cl.
CPC ........... *H01F 27/266* (2013.01); *H01F 17/04* (2013.01)

(58) Field of Classification Search
CPC ....... H01F 27/266; H01F 17/04; H01F 17/045
See application file for complete search history.

(56) References Cited

U.S. PATENT DOCUMENTS 6,373,366 B1 * 4/2002 Sato ...................... H01F 27/292 336/200
2015/0084731 A1 * 3/2015 Takagi .................... H01F 19/08 336/212
2017/0229227 A1 * 8/2017 Igarashi .................... H01F 3/10
2018/0019046 A1 * 1/2018 Miyamoto ................ H01F 3/14
2018/0286554 A1 * 10/2018 Kojima ................. H01F 17/045
2020/0105451 A1 * 4/2020 Horie ..................... H01F 27/263
2020/0335249 A1 * 10/2020 Sukegawa ............. H01F 27/027

FOREIGN PATENT DOCUMENTS

| | | | | |
|---|---|---|---|---|
| CN | 110970204 | A | | 4/2020 |
| JP | 2004172188 | A | * | 6/2004 |
| JP | 2008-198740 | A | | 8/2008 |
| JP | 2013-077857 | A | | 4/2013 |
| JP | 2018-010999 | A | | 1/2018 |
| JP | 2020-057656 | A | | 4/2020 |

* cited by examiner

*Primary Examiner* — Malcolm Barnes

(74) *Attorney, Agent, or Firm* — Studebaker Brackett PLLC

(57) ABSTRACT

Bonding strength between a core and a top plate is increased in a coil component. Surface roughnesses of a top surface of a flange portion of the core and a lower main surface of the top plate are different. For example, the surface roughness of the lower main surface is smaller than the surface roughness of the top surface. A protrusion protruding from the lower main surface having smaller surface roughness and in contact with the top surface of the flange portion of the core is in a region where the lower main surface of the top plate and the top surface of the flange portion of the core face each other with an adhesive interposed therebetween. The protrusion can increase a surface area of a bonding surface of the top plate having smaller surface roughness, and provide an anchor effect of the adhesive on the top plate.

20 Claims, 3 Drawing Sheets

COIL COMPONENT

CROSS-REFERENCE TO RELATED APPLICATION

This application claims benefit of priority to Japanese Patent Application No. 2021-115779, filed Jul. 13, 2021, the entire content of which is incorporated herein by reference.

BACKGROUND

Technical Field

The present disclosure relates to a coil component including a core having a winding core portion around which a wire is wound, and a first flange portion and a second flange portion provided at end portions of the winding core portion, and a top plate bonded and fixed to the core in a state of being passed between the first flange portion and the second flange portion, and particularly relates to a structure of a bonding portion between the core and the top plate.

Background Art

For example, Japanese Patent Application Laid-Open No. 2020-57656 discloses a coil component including a core having a winding core portion around which a wire is wound, and a first flange portion and a second flange portion provided at end portions of the winding core portion, and a top plate bonded and fixed to the core in a state of being passed between the first flange portion and the second flange portion. An adhesive containing an organic material and a filler is used for bonding the core and the top plate.

The technique described in Japanese Patent Application Laid-Open No. 2020-57656 has a problem about improving the bonding strength between the core and the top plate, and describes that surface roughness of a surface of the core bonded to the top plate with the adhesive interposed therebetween is larger than an average particle diameter of the filler in order to solve this problem. Japanese Patent Application Laid-Open No. 2020-57656 describes that the surface roughness of the surface of the top plate bonded to the core with the adhesive interposed therebetween is smaller than the surface roughness of the surface of the core bonded to the top plate with the adhesive interposed therebetween.

The technique described in Japanese Patent Application Laid-Open No. 2020-57656 is intended to improve the bonding strength between the core and the top plate by bringing the filler into direct contact with the flange portion of the core and the top plate or bringing the core and the top plate closer to each other with the adhesive interposed therebetween by inserting the filler into a recess of the top surface of the flange portion of the core.

Paragraph 0054 and FIG. 7 of Japanese Patent Application Laid-Open No. 2020-57656 describe an example in which protrusions are provided at two positions away from a central portion in a width direction of the surface of the flange portion of the core which is a side having larger surface roughness bonded to the top plate with the adhesive interposed therebetween. This is to avoid a problem in a bonding state between the core and the top plate caused by the occurrence of undulation in which a center of the top surface of the flange portion in the width direction is curved in a recessed direction in a manufacturing process of the core. That is, an adjacent portion is provided at a position away from the center of the flange portion in the width direction by the protrusion, and thus, stability at the time of bonding can be increased. As a result, bonding strength is increased.

SUMMARY

As in the technique described in Japanese Patent Application Laid-Open No. 2020-57656, when the surface roughness of the surface of the top plate bonded to the core with the adhesive interposed therebetween is smaller than the surface roughness of the surface of the core bonded to the top plate with the adhesive interposed therebetween, the anchor effect of the adhesive cannot be expected for the top plate having the smaller surface roughness. Accordingly, for example, strength on a top plate side in a shearing direction becomes relatively low, and a problem that the adhesive is easily peeled off can be encountered.

As described above, Japanese Patent Application Laid-Open No. 2020-57656 describes that the protrusion is provided on the flange portion of the core. However, since this protrusion is provided on the flange portion of the core which is the side having the larger surface roughness, the anchor effect of the adhesive on the top plate having the smaller surface roughness is not exhibited.

Therefore, the present disclosure provides a structure capable of improving bonding strength between a core and a top plate in a coil component.

The present disclosure provides a coil component including a core that has a winding core portion extending in an axial direction, and a first flange portion and a second flange portion provided at a first end and a second end opposite to each other in the axial direction of the winding core portion, respectively, a top plate that has a lower main surface and an upper main surface facing in opposite directions to each other, and at least one wire that is wound around the winding core portion.

The first flange portion and the second flange portion have a first bottom surface and a second bottom surface facing a mounting substrate side during mounting and a first top surface and a second top surface opposite to the first bottom surface and the second bottom surface, respectively. The top plate is fixed to the core in a state where the lower main surface faces the first top surface and the second top surface with an adhesive interposed therebetween.

In such a coil component, when surface roughness of at least one of the first top surface and the second top surface of the core and surface roughness of the lower main surface of the top plate are differentiated from each other, a surface having smaller surface roughness, of the at least one of the first top surface, the second top surface and the lower main surface, is a first surface, and a surface having larger surface roughness, of the other of the at least one of the first top surface, the second top surface and the lower main surface, is a second surface, at least one protrusion protruding from the first surface and in contact with the second surface is provided in a region in which the first surface and the second surface face each other with the adhesive interposed therebetween.

The surface roughness can be determined from a developed area ratio of an Sdr interface by, for example, measuring a height of a sample surface in any ⅓ range in a field of view of objective lens×20 by using a laser microscope "VK-X1000" and analyzing the height with analysis software.

According to the present disclosure, since at least one protrusion protrudes from the first surface having the smaller surface roughness and in contact with the second surface having the larger surface roughness is provided, a surface area of a bonding surface of the first surface having smaller surface roughness can be increased, and an anchor effect of the adhesive on the first surface can be obtained, since the protrusion itself is caught, shear strength in an extending direction of the first surface and the second surface facing each other can be increased. Therefore, in the coil component, the bonding strength between the core and the top plate can be improved, and the coil component excellent in impact resistance and vibration resistance can be obtained.

BRIEF DESCRIPTION OF THE DRAWINGS

FIG. 2A is a front view and FIG. 2B is a bottom view;

DETAILED DESCRIPTION

A coil component 1 according to a first embodiment of the present disclosure will be described with reference to FIG. 1.

Figure 1:
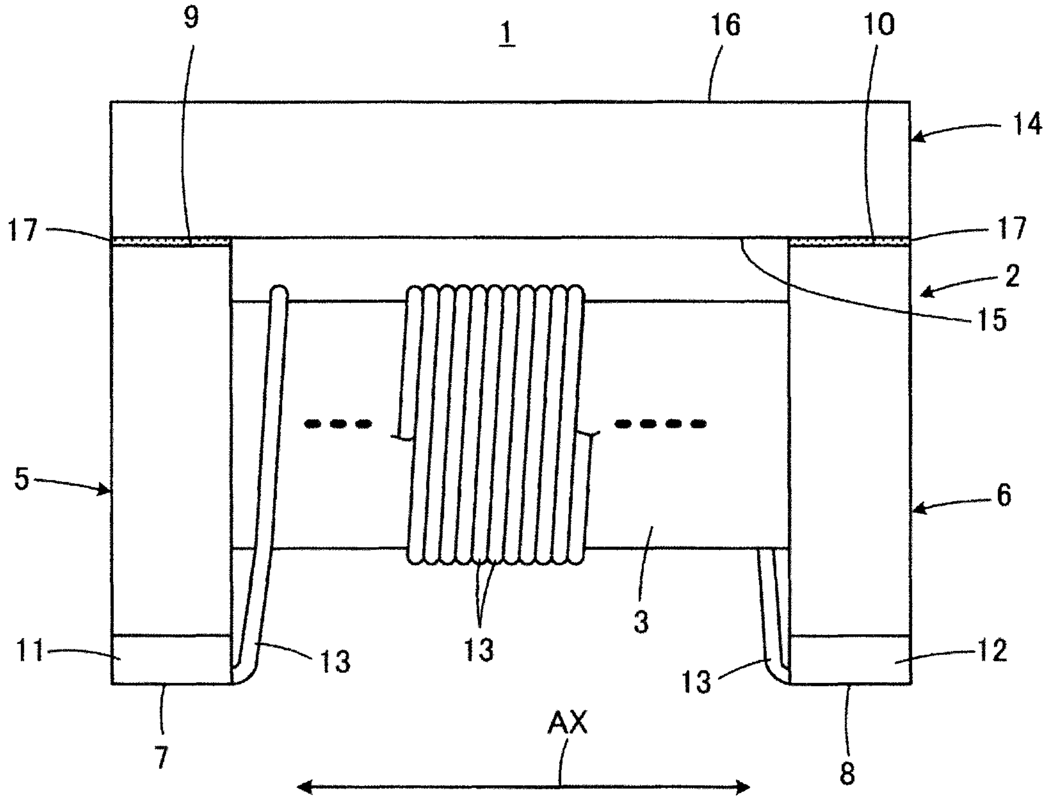
FIG. 1 is a front view illustrating an appearance of a coil component according to a first embodiment of the present disclosure.

As illustrated in FIG. 1, the coil component 1 includes a core 2 made of, for example, ferrite such as Ni—Zn based ferrite, alumina, or resin containing metal magnetic powder. The core 2 includes a winding core portion 3 extending in an axial direction AX, and a first flange portion 5 and a second flange portion 6 provided at a first end and a second end opposite to each other in the axial direction AX of the winding core portion 3, respectively. The winding core portion 3 has, for example, a quadrangular sectional shape, but may have a polygonal shape such as a hexagonal shape, a circular shape, an elliptical shape, or a shape obtained by combining these shapes.

The first flange portion 5 and the second flange portion 6 have a first bottom surface 7 and a second bottom surface 8 facing a mounting substrate (not illustrated) side during mounting, and a first top surface 9 and a second top surface 10 opposite to the first bottom surface 7 and the second bottom surface 8, respectively.

A first terminal electrode 11 is provided on the bottom surface 7 of the first flange portion, and a second terminal electrode 12 is provided on the bottom surface 8 of the second flange portion 6. The terminal electrodes 11 and 12 are formed by, for example, immersing or printing a conductive paste containing conductive metal powder such as Ag powder, then baking the paste, and further performing Cu plating, Ni plating, and Sn plating on the paste in order. Alternatively, the terminal electrodes 11 and 12 may be provided by attaching a terminal member made of a conductive metal plate to the flange portions 5 and 6.

At least one wire 13 is wound around the winding core portion 3. The wire 13 includes, for example, a center wire material made of a favorable conductive metal such as copper, silver, or gold, and an insulating film covering the center wire material and made of an electrically insulating resin such as polyamideimide, polyurethane, or polyesterimide. The center wire material has a diameter of, for example, 60 μm or more and 160 μm or less (i.e., from 60 μm to 160 μm). One end of the wire 13 is connected to the first terminal electrode 11, and the other end is similarly connected to the second terminal electrode 12. For example, thermal pressure bonding, ultrasonic welding, laser welding, or the like is applied to the connection between the terminal electrodes 11 and 12 and the wire 13. The number of turns of the wire 13 on the winding core portion 3 is arbitrarily selected according to required characteristics. The wire 13 may be wound in multiple layers as necessary.

The coil component 1 includes a top plate 14 passed between the first flange portion 5 and the second flange portion 6. The top plate 14 has a lower main surface 15 and an upper main surface 16 facing in opposite directions to each other. The top plate 14 is made of, for example, ferrite, alumina, or resin containing metal magnetic powder. When both the core 2 and the top plate 14 are made of a magnetic material, the top plate 14 constitutes a closed magnetic path in cooperation with the core 2.

The top plate 14 is fixed to the core 2 in a state where the lower main surface 15 faces the top surface 9 of the first flange portion 5 and the top surface 10 of the second flange portion 6 with an adhesive 17 interposed therebetween. The adhesive 17 contains, for example, a thermosetting resin such as an epoxy-based resin. An inorganic filler such as a silica filler may be added to the adhesive 17 in order to improve thermal shock resistance.

As an example, the coil component 1 has a dimension of 2.0 mm in a length direction (axial direction AX), a dimension of 1.2 mm in a width direction (vertical direction in FIG. 2B), and a dimension of 1.6 mm in a height direction (vertical direction in FIG. 1).

The coil component 1 is preferably manufactured, for example, as follows.

First, the core 2 and the top plate 14 are prepared. In order to manufacture the core 2 and the top plate 14, for example, a sintered body to become the core 2 and the top plate 14 is obtained by press-molding ferrite powder with a mold and firing the obtained molded body. Thereafter, burrs are removed by performing barrel polishing on the sintered body to become the core 2 and the top plate 14, and thus, the core 2 and the top plate 14 are obtained. Although not illustrated in FIGS. 1 and 2A and 2B, ridgelines of the core 2 and the top plate 14 are chamfered with small rounded corners.

Subsequently, in order to provide the terminal electrodes 11 and 12 on the core 2, for example, a conductive paste containing Ag is applied to the bottom surfaces 7 and 8 of the first flange portion 5 and the second flange portion 6, the conductive paste is baked, and then Cu plating, Ni plating, and Sn plating are sequentially applied by applying an electrolytic barrel plating method.

Subsequently, the wire 13 is wound around the winding core portion 3 of the core 2 by, for example, a nozzle, and one end and the other end of the wire 13 are connected to the first terminal electrode 11 and the second terminal electrode 12, respectively. Here, for example, thermal pressure bonding using a heater chip is applied to the connection between the wire 13 and the terminal electrodes 11 and 12. Excess of the wire 13 connected to the terminal electrodes 11 and 12 is cut and removed by a cutting blade.

As described above, the coil component 1 is completed.

The coil component 1 has the following features.

First, there is a feature that the surface roughness of at least one of the first top surface 9 and the second top surface 10 of the core 2 and the surface roughness of the lower main surface 15 of the top plate 14 are different from each other.

Second, there is a feature that when a surface having smaller surface roughness of at least one of the first top surface 9, the second top surface 10 and the lower main surface 15 is a first surface, and a surface having larger surface roughness of the other of at least one of the first top surface 9, the second top surface 10 and the lower main surface 15 is a second surface, at least one protrusion 21 protruding from the first surface and in contact with the second surface is provided in a region where the first surface and the second surface face each other with the adhesive 17 interposed therebetween.

Figure 2A:
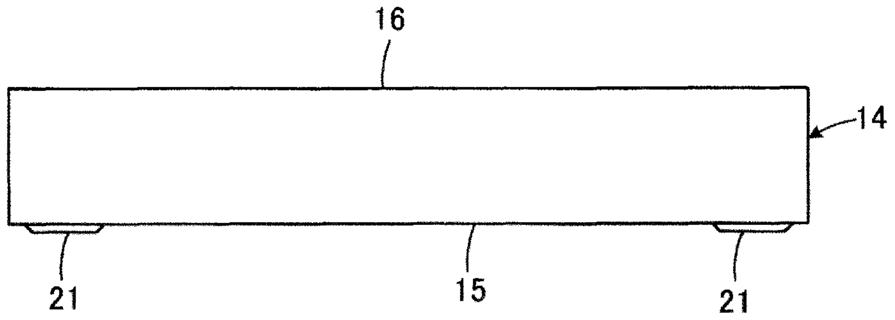
FIGS. 2A and 2B illustrate a top plate included in the coil component illustrated in FIG. 1, where
Figure 2B:
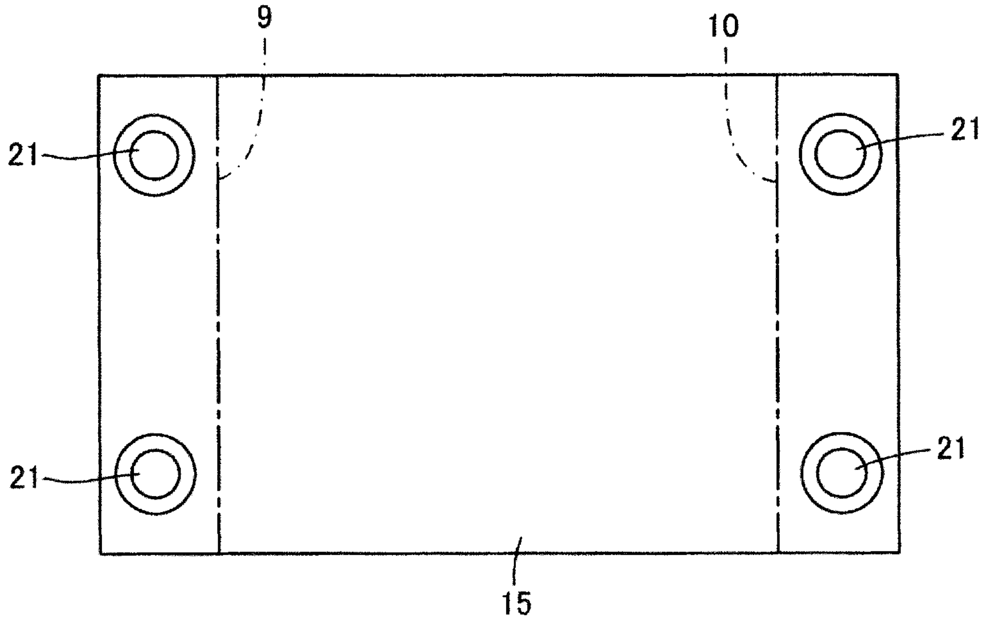
Figure 3:
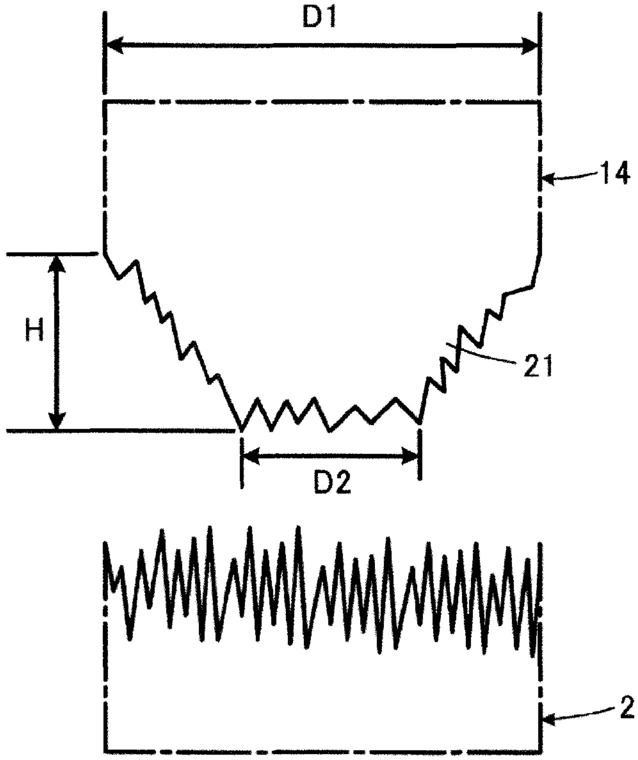
FIG. 3 is an enlarged sectional view schematically illustrating a protrusion provided in a region where a core and the top plate face each other.

In this embodiment, as schematically illustrated in FIG. 3, the first surface having the smaller surface roughness is the lower main surface 15 of the top plate 14, and the second surface having the larger surface roughness are the first top surface 9 and the second top surface 10 of the core 2 (the first top surface 9 and the second top surface 10 can collectively be referred to as a "second surface"). Accordingly, as illustrated in FIGS. 2A and 2B, the protrusions 21 are provided on the lower main surface 15 of the top plate 14. More specifically, the protrusions 21 are provided in two portions facing each of the first top surface 9 and the second top surface 10 on the lower main surface 15 of the top plate 14 in a region where the top plate 14 and the core 2 face each other with the adhesive 17 interposed therebetween. In the bottom view of the top plate 14 of FIG. 2B, outlines of the first top surface 9 and the second top surface 10 are indicated by dashed dotted lines such that a positional relationship between the lower main surface 15 of the top plate 14 and the first top surface 9 and the second top surface 10 can be seen.

A plurality of, for example, two protrusions 21 are provided in a region where the lower main surface 15 of the top plate 14 and the first top surface 9 face each other, and a plurality of, for example, two protrusions 21 are similarly provided in a region where the lower main surface 15 of the top plate 14 and the second top surface 10 face each other. These protrusions 21 are arranged at symmetrical positions with respect to a surface including a center axis of the winding core portion 3 and orthogonal to the lower main surface 15, and are arranged at symmetrical positions with respect to a surface orthogonal to the center axis of the winding core portion 3 and passing through a middle point in the axial direction AX of the winding core portion 3.

When the plurality of protrusions 21 are arranged at the symmetrical positions described above, the top plate 14 can be prevented from being inclined with respect to the core 2, and a posture of the top plate 14 with respect to the core 2 can be stabilized. Accordingly, a distance between the core 2 and the top plate 14 is constant.

The protrusion 21 has, for example, a truncated cone shape. Accordingly, an apex portion is not a point but is planar. As described above, it is possible to make the protrusion 21 less likely to be chipped in a manufacturing procedure by forming the protrusion 21 into the truncated cone shape as compared with a case where the protrusion is formed into a cylindrical shape, and it is possible to perform stable assembly with less wobbling during the assembly of the core 2 and the top plate 14 as compared with a case where the apex portion is a point. Referring to FIG. 3, the truncated cone-shaped protrusion 21 has, for example, a bottom surface having a diameter D1 of 150 μm or more and 250 μm or less (i.e., from 150 μm to 250 μm), a top surface having a diameter D2 of 100 μm or more and 200 μm or less (i.e., from 100 μm to 200 μm), and a height H of 20 μm or more and 60 μm or less (i.e., from 20 μm to 60 μm).

According to the first embodiment described above, since the plurality of protrusions 21 protruding from the lower main surface 15 of the top plate 14 having the smaller surface roughness and in contact with the top surfaces 9 and 10 of the core 2 having the larger surface roughness are provided, it is possible to increase a surface area of a bonding surface of the lower main surface 15 of the top plate 14 having the smaller surface roughness, and it is possible to obtain an anchor effect of the adhesive 17 on the lower main surface 15 of the top plate 14. The protrusion 21 itself is caught, and thus, it is possible to increase the shear strength in a direction in which facing surfaces of the top plate 14 and the core 2 extend. Accordingly, in the coil component 1, the bonding strength between the core 2 and the top plate 14 can be improved, and the coil component 1 can be excellent in impact resistance and vibration resistance.

The protrusion 21 forms a constant interval between the core 2 and the top plate 14. This interval contributes to improvement of DC superposition characteristics of an inductor when the coil component 1 functions as the inductor.

As in the first embodiment described above, when the protrusion 21 is provided on the top plate 14, it is possible to avoid complication of the mold and complication in manufacturing as compared with a case where the protrusion is provided on the core 2. However, when such an advantage is not particularly desired, a protrusion may be provided in the core 2 as in a second embodiment to be described below. In the second embodiment, a protrusion is not provided on the top plate.

Figure 4:
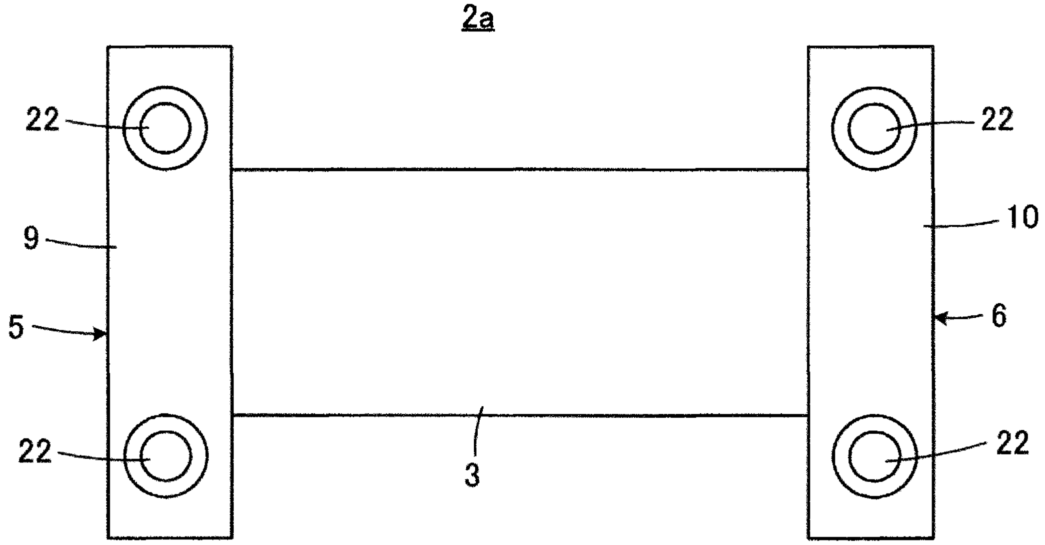
FIG. 4 is a top view illustrating a core included in a coil component according to a second embodiment of the present disclosure.

FIG. 4 is a top view illustrating a core 2*a* included in a coil component according to the second embodiment of the present disclosure. In FIG. 4, elements corresponding to the elements illustrated in FIG. 1 or 2A or 2B are denoted by the same reference numerals, and redundant description is omitted.

In the second embodiment, the first surface having the smaller surface roughness is at least one of the first top surface 9 and the second top surface 10 of the core 2*a* (the first top surface 9 and the second top surface 10 can collectively be referred to as a "first surface"), and the second surface having the larger surface roughness is the lower main surface 15 of the top plate 14. Thus, a relationship of the surface roughness is opposite to that in the first embodiment. Accordingly, as illustrated in FIG. 4, protrusions 22 are provided on at least one of the first top surface 9 and the second top surface 10 of the core 2*a*. In this embodiment, the protrusions are provided on both the first top surface 9 and the second top surface 10 of the core 2*a*. The protrusion 22 has, for example, a truncated cone shape as in the case of the protrusion 21 described above.

A plurality of, for example, two protrusions 22 are provided on each of the first top surface 9 and the second top surface 10. These protrusions 22 are arranged at symmetrical positions with respect to a surface including the center axis of the winding core portion 3 and orthogonal to the lower main surface 15 of the top plate 14, and are arranged at symmetrical positions with respect to a surface orthogonal to the center axis of the winding core portion 3 and passing through a middle point in the axial direction AX of the winding core portion 3.

Similarly to the case of the first embodiment. In the case of the second embodiment, when the plurality of protrusions 22 are arranged at the symmetrical positions described above, it is also possible to prevent the top plate from being inclined with respect to the core 2*a*, and it is also possible to stabilize the posture of the top plate with respect to the core 2*a*.

According to the second embodiment described above, since the plurality of protrusions 22 protruding from the first top surface 9 and the second top surface 10 of the core 2*a* having the smaller surface roughness and in contact with the lower main surface 15 of the top plate 14 having the larger surface roughness are provided, it is possible to increase the surface area of the bonding surface of the first top surface 9 and the second top surface 10 of the core 2*a* having the smaller surface roughness, and it is possible to obtain the anchor effect of the adhesive on the first top surface 9 and the second top surface 10 of the core 2*a*. The protrusion 22 itself is caught, and thus, it is possible to increase the shear strength in the direction in which the facing surfaces of the core 2*a* and the top plate extend. Accordingly, in the coil component, the bonding strength between the core 2*a* and the top plate can be improved, and the coil component can be excellent in impact resistance and vibration resistance.

In the first and second embodiments, the plurality of protrusions 21 or 22 may not necessarily be arranged at the symmetrical positions. For example, in the first embodiment, the protrusion 21 may be provided only in a portion of the lower main surface 15 of the top plate 14 facing one of the first top surface 9 and the second top surface 10. In the second embodiment, the protrusion 22 may be provided only on one of the first top surface 9 and the second top surface 10.

As described above, the coil component 1 according to the first and second embodiments has a feature that the surface roughness of at least one of the first top surface 9 and the second top surface 10 of the core 2 or 2*a* and the surface roughness of the lower main surface 15 of the top plate 14 are different from each other. In order to control the surface roughness as described above, various methods are used. For example, there are a method for differentiating the material of the core and the material of the top plate from each other, a method for differentiating degrees of smoothness of a mold for molding the core and a mold for molding the top plate from each other, a method for differentiating a firing temperature and a firing time between the firing of the core and the firing of the top plate, and a method for differentiating a time for barrel polishing performed after the firing between the core and the top plate.

For example, when the method for differentiating the time for barrel polishing between the core and the top plate is adopted, when the surface roughness is represented by a developed area ratio of an Sdr interface (a degree of increase in the surface area as compared with a flat surface), the time for barrel polishing can be set to 0.04 to 0.12 for 50 minutes, and the time for barrel polishing can be set to 0.15 to 0.22 for 60 minutes. That is, as the time for barrel polishing was longer, a collision frequency of a polishing medium increased, and thus, the surface roughness increased.

The surface roughness described above is obtained by, for example, measuring a height of a sample surface with a laser microscope "VK-X1000" and analyzing with analysis software.

Specifically, in the flange portions 5 and 6, the developed area ratio of the Sdr interface was obtained from any ⅓ range in a field of view of an objective lens×20 in a flat portion excluding protrusions and peripheral edges of the first top surface 9 and the second top surface 10. On the other hand, in the top plate 14, the developed area ratio of the Sdr interface was obtained by averaging the developed area ratio from an any ⅓ range in the field of view of the objective lens×20 in a flat portion excluding the protrusion and the peripheral edge of the lower main surface 15.

In order to control the surface roughness of the core and the top plate, when the method for differentiating the material of the core and the material of the top plate from each other is adopted, for example, it is possible to combine ferrite having a magnetic permeability of about 22 for the top plate and ferrite having a magnetic permeability of about 1000 for the core. This combination can contribute to improvement of DC superposition characteristics as long as the protrusion is not too high.

Although the present disclosure has been described in conjunction with the illustrated embodiments, various other modifications are possible within the scope of the present disclosure.

For example, the coil component to which the present disclosure is directed may constitute a transformer, a balun, or the like other than a single coil or a common mode choke coil as in the illustrated embodiments. Accordingly, the number of wires is also changed according to a function of the coil component, and the number of terminal electrodes provided on each flange portion can also be changed accordingly.

In configuring the coil component according to the present disclosure, partial replacement or combination of configurations is possible between different embodiments described in this specification.

What is claimed is:

1. A coil component comprising:

a core that has a winding core portion extending in an axial direction, and a first flange portion and a second flange portion at a first end and a second end opposite to each other in the axial direction of the winding core portion, respectively;

a top plate that has a lower main surface and an upper main surface facing in opposite directions to each other; and at least one wire that is wound around the winding core portion, the first flange portion and the second flange portion having a first bottom surface and a second bottom surface, respectively, facing a mounting substrate side during mounting, and a first top surface and a second top surface opposite to the first bottom surface and the second bottom surface, respectively, the top plate being fixed to the core such that the lower main surface of the top plate faces the first top surface of the first flange portion and the second top surface of the second flange portion with an adhesive interposed therebetween, and wherein surface roughness of at least one of the first top surface of the first flange portion and the second top surface of the second flange portion, and surface roughness of the lower main surface of the top plate, are differentiated from each other, when a surface having smaller surface roughness is a first surface, and a surface having larger surface roughness is a second surface, of the lower main surface and one of the first top surface and the second top surface, at least one protrusion protruding from the first surface and in contact with the second surface is in a region in which the first surface and the second surface face each other with the adhesive interposed therebetween.

2. The coil component according to claim 1, wherein the first surface is the lower main surface of the top plate, and the second surface is at least one of the first top surface of the first flange portion and the second top surface of the second flange portion.

3. The coil component according to claim 2, wherein the protrusion is at a portion of the lower main surface facing one of the first top surface and the second top surface.

4. The coil component according to claim 2, wherein the at least one protrusion is a plurality of protrusions, which are at two portions of the lower main surface facing each of the first top surface and the second top surface.

5. The coil component according to claim 2, wherein the at least one protrusion is a plurality of the protrusions, which are in one region in which the first surface and the second surface face each other with the adhesive interposed therebetween.

6. The coil component according to claim 2, wherein the core and the top plate are made of materials different from each other.

7. The coil component according to claim 3, wherein the at least one protrusion is a plurality of the protrusions, which are in one region in which the first surface and the second surface face each other with the adhesive interposed therebetween.

8. The coil component according to claim 3, wherein the core and the top plate are made of materials different from each other.

9. The coil component according to claim 4, wherein the at least one protrusion is a plurality of the protrusions, which are in one region in which the first surface and the second surface face each other with the adhesive interposed therebetween.

10. The coil component according to claim 4, wherein the core and the top plate are made of materials different from each other.

11. The coil component according to claim 1, wherein the first surface is at least one of the first top surface and the second top surface of the first and second flange portions, and the second surface is the lower main surface of the top plate.

12. The coil component according to claim 1, wherein the protrusion is on one of the first top surface and the second top surface of the first and second flange portions.

13. The coil component according to claim 1, wherein the at least one protrusion is a plurality of protrusions, which are on both the first top surface and the second top surface of the first and second flange portions.

14. The coil component according to claim 11, wherein the at least one protrusion is a plurality of the protrusions, which are in one region in which the first surface and the second surface face each other with the adhesive interposed therebetween.

15. The coil component according to claim 11, wherein the core and the top plate are made of materials different from each other.

16. The coil component according to claim 12, wherein the at least one protrusion is a plurality of the protrusions, which are in one region in which the first surface and the second surface face each other with the adhesive interposed therebetween.

17. The coil component according to claim 1, wherein the at least one protrusion is a plurality of the protrusions, which are in one region in which the first surface and the second surface face each other with the adhesive interposed therebetween.

18. The coil component according to claim 17, wherein the plurality of protrusions are arranged at symmetric positions with respect to a surface including a center axis of the winding core portion and being orthogonal to the lower main surface of the top plate.

19. The coil component according to claim 17, wherein the plurality of protrusions are arranged at symmetric positions with respect to a surface being orthogonal to the center axis of the winding core portion and passing through a middle point in the axial direction of the winding core portion.

20. The coil component according to claim 1, wherein the core and the top plate are made of materials different from each other.

* * * * *